United States Patent
Kung et al.

[11] Patent Number: 5,434,918
[45] Date of Patent: Jul. 18, 1995

[54] METHOD FOR PROVIDING MUTUAL AUTHENTICATION OF A USER AND A SERVER ON A NETWORK

[75] Inventors: Kenneth C. Kung, Cerritos; Erwin W. Bathrick, Brea; Cheng-Chi Huang, Irvine; Mae-Hwa Ma, Cerritos; Todd E. Matthews, Santa Ana; James E. Zmuda, Lake Forest, all of Calif.

[73] Assignee: Hughes Aircraft Company, Los Angeles, Calif.

[21] Appl. No.: 167,603

[22] Filed: Dec. 14, 1993

[51] Int. Cl.⁶ .......................... H04L 9/32; H04L 9/00; H04L 9/08
[52] U.S. Cl. ............................... 380/25; 380/9; 380/21; 380/23; 380/49; 380/50
[58] Field of Search ................... 380/4, 9, 21, 23, 24, 380/25, 49, 50; 340/825.31, 825.34

[56] References Cited
U.S. PATENT DOCUMENTS

| | | | |
|---|---|---|---|
| 4,386,233 | 5/1983 | Smid et al. | 380/25 |
| 4,453,074 | 6/1984 | Weinstein | 380/23 |
| 4,529,870 | 7/1985 | Chaum | 380/25 X |
| 5,241,594 | 8/1993 | Kung | 380/4 |
| 5,249,230 | 9/1993 | Mihm, Jr. | 380/23 |

*Primary Examiner*—Bernarr E. Gregory
*Attorney, Agent, or Firm*—W. K. Denson-Low

[57] ABSTRACT

An authentication method that permits a user and a file serving workstation to mutually authenticate themselves. This is accomplished by exchanging a random number that is encrypted by a password that is known to the user and stored in a password file on the file serving workstation. A logon ID is sent from the client workstation to the server workstation. The stored user password corresponding to the user ID is retrieved from the password file. A random number is created that is encrypted by a symmetric encryption algorithm on the server workstation using the retrieved user password, and which provides an encrypted password. The user is then requested to enter the password into the user workstation. The entered password is used to decrypt the encrypted password received from the server workstation and retrieve the random number therefrom to authenticate the server workstation. The random number is then used as the encryption and decryption key for communication between the user and server workstations. An encrypted message is transmitted using the random number from the client workstation to the server workstation. The encrypted message is decrypted at the server workstation to authenticate the user.

1 Claim, 1 Drawing Sheet

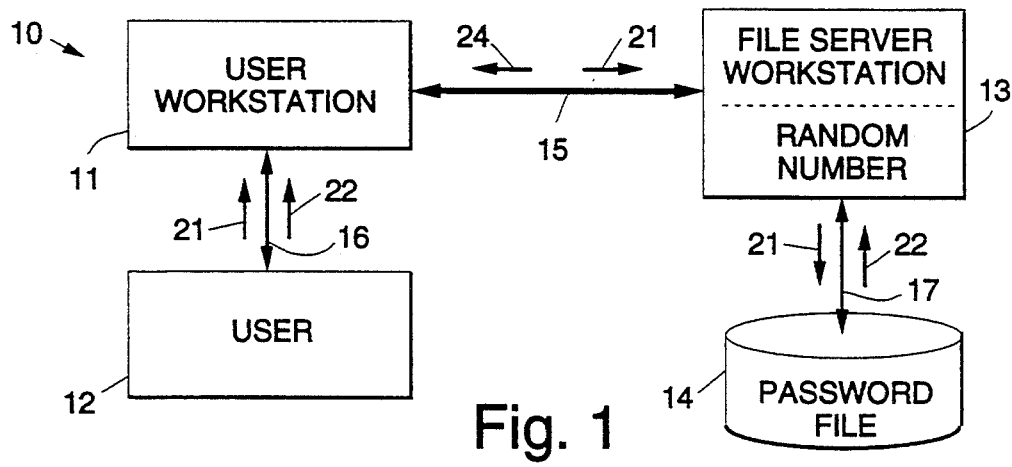

METHOD FOR PROVIDING MUTUAL AUTHENTICATION OF A USER AND A SERVER ON A NETWORK

BACKGROUND

The present invention relates generally to computer systems, and more particularly, to a mutually authenticating communication method or protocol for use in communicating between a file server workstation and a user operating a workstation connected to a network.

Conventional authentication protocols provide for authentication of a user operating a client workstation interconnected by way of a network to a file serving workstation. The authentication protocol is such that the user transmits a password to the file serving workstation and a user password is normally transmitted in clear text (unencrypted). This conventional authentication protocol allows for exchanges of authentication information (logon IDs, passwords, etc.) between the communicating workstations without providing for protection of the information.

More particularly, using a typical conventional authentication method, the file serving workstation only tries to authenticate the user at the client workstation. The file serving workstation attempts to authenticate the user on the client workstation simply by requesting the password. If the network is not protected at this point, then the password is transmitted in clear text.

Consequently, the user has no way to know whether he or she is really communicating with the desired or correct file serving workstation. If a remote computer is able to mimic the behavior of the file serving workstation, then the user may be spoofed or fooled into thinking that he or she is communication with the correct file serving workstation.

Accordingly, it is an objective of the present invention to provide for a mutually authenticating communication method or protocol that overcomes the problems of conventional protocols. It is a further objective of the present invention to provide for a mutually authenticating communication method or protocol for use in communicating between a file server and a user operating a workstation connected to a network.

SUMMARY OF THE INVENTION

In order to meet the above objectives, the present invention is a mutual authentication method for use in authenticating a user that operates a client workstation that is coupled to a file server workstation having a password file comprising a password known to the user. The method 30 comprising the following steps.

A logon ID is transmitted from the client workstation to the server workstation. The stored user password corresponding to the user ID is retrieved using the transmitted logon ID is retrieved from the password file. A random number is created that is encrypted by a symmetric encryption algorithm on the server workstation using the retrieved user password, and which provides an encrypted password. The user is then requested to enter the password into the user workstation. The entered password is used to decrypt the encrypted password received from the server workstation and retrieve the random number therefrom to authenticate the server workstation.

The random number is then used as the encryption and decryption key for communication between the user and server workstations. An encrypted message is transmitted using the random number from the client workstation to the server workstation. The encrypted message is decrypted at the server workstation to authenticate the user.

The present mutual authentication protocol permits a user that operates a client workstation connected to a network to authenticate himself or herself to a desired file serving workstation and the file serving workstation to authenticate itself to the user. This is accomplished by exchanging a random number that is encrypted by a password that is only known to the user and that is stored on the file serving workstation. The present mutual authentication protocol permits both the file serving workstation and the user at the client workstation to authenticate each other. Unlike conventional protocols, in the mutual authentication protocol of the present invention, the user's password is never exchanged in clear text.

The present invention may be employed on computer networks to provide for network security. The present protocol will authenticate individual users on client workstations and permit users to authenticate the file serving workstation. In addition, the present protocol may be adapted to provide an alternative method for creating a session key used by an encryption algorithm.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 1 is a diagram illustrating a networked computer system on which a mutual authentication method in accordance with the principles of the present invention is employed; and FIG. 2 is a flow diagram of the mutual authentication method in accordance with the principles of the present invention.

DETAILED DESCRIPTION

Referring to the drawing figures, FIG. 1 is a diagram illustrating a networked computer system 10 on which a mutual authentication method 30 in accordance with the principles of the present invention is employed. The user communicates with the user workstation 11 by means of a keyboard, for example, generically illustrated by a local communication link 16.

The networked computer system 10 is comprised of a user workstation 11 that is operated by a user 12. The user workstation 11 communicates with a networked file server workstation 13 by means of a communication link 15. The user workstation 11 is comprised of a database 14 that includes a password file that stores a password of the user 12.

A logon ID 21 and the user password 22 are communicated between the user and the user workstation 11 in accordance with prompts that are displayed on a display monitor, for example. The logon ID 21 is transmitted from the user workstation 11 to the file server workstation 13 over the communication link 15. The logon ID 21 is used to retrieve the stored user password 22 from the password file database 14.

The retrieved password is then used by the file server workstation the generate a random number. The generated random number is used as a key to encrypt the user password and the encrypted password 24 is sent to the user workstation 11. The user 11 is prompted to enter his or her password 22 to decrypt the encrypted password 24 and obtain the random number. This authenticates the file server workstation 13 to the user 12.

The next message transmitted from the client workstation 11 to the server workstation 13 is encrypted using the random number. If the server workstation 13 properly decrypts this next message received from the client workstation 11, then the server workstation 13 has authenticated the user, and communication is fully established between the workstations 11, 13. The mutual authentication method 30 thus provides a protocol for mutually authenticating a user 11 and the file server workstation 12 or other computing machine.

For purposes of completeness, FIG. 2 is a flow diagram illustrating the steps in the mutual authentication method 30 of the present invention. The steps in the mutual authentication method 30 are as follows. The user 12 uses a client workstation 11 and sends his or her logon ID 21 to the server workstation 13, as illustrated in step 31. The server workstation 13 uses the logon ID 21 to retrieve a user password 22 corresponding to the user ID 21 that is stored in a password database file on a disk drive 14, for example, as illustrated in step 32. The password file is protected by the server workstation 13 by using a symmetric encryption algorithm, for example, employed as part of the operating system of the server workstation 13.

The server workstation 13 then creates a random number which is encrypted by the symmetric encryption algorithm using the user password 22 retrieved from the database 14, and which provides an encrypted password 24, as illustrated in step 33. The user password 22 is used as an encryption key before transmitting the encrypted password 24 to the client workstation over the network communication link 15. The client workstation 13 then requests the user to enter his password 22, as illustrated in step 34, and this password 22 is used decrypt the encrypted password 24 received from the server workstation 13 and retrieve the random number therefrom, as illustrated in step 35.

If the random number encrypted password 24 is correctly decrypted by the client workstation 11, then the user 12 knows that he or she is communicating with the server workstation 13 because only the server workstation 13 has his or her password 22 corresponding to the transmitted logon ID 21, as illustrated in step 36. At this point the retrieved random number is used as the encryption and decryption key for communication between the user and server workstations 11, 13, as illustrated in step 37.

The next message transmitted from the client workstation 11 to the server workstation 13 is encrypted using the random number, as illustrated in step 38. If the server workstation 13 properly decrypts this next message received from the client workstation 11, then the server workstation 13 has authenticated the user 12, as illustrated in step 39, because only the user has and can use his or her password 22 to determine the value of the random number. Hence, the method 30 has been used to mutually authenticate the user and file server workstations 11, 13.

Thus there has been described a new and improved mutually authenticating communication method or protocol for use in communicating between a file server and a user operating a workstation connected to a network. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A mutual authentication method for use in authenticating a user operating a client workstation that is coupled to a file server workstation comprising a password file having a password known to the user, said method comprising the steps of:

sending a logon ID from the client workstation to the server workstation;

retrieving the stored user password corresponding to time logon ID;

generating an encrypted password that comprises a random number that is encrypted by a symmetric encryption algorithm on the server workstation using the retrieved user password from the password file;

prompting the user to enter the password into the user workstation;

decrypting the encrypted password received from the server workstation using the entered password to retrieve the random number therefrom to authenticate the server workstation;

using the random number as an encryption and decryption key for communication between the client and server workstations;

transmitting an encrypted message using the random number from the client workstation to the server workstation; and decrypting the encrypted message at the server workstation to authenticate the user.

* * * * *